United States Patent
Herrmann

(10) Patent No.: US 8,700,291 B2
(45) Date of Patent: Apr. 15, 2014

(54) SYSTEM FOR CONTROLLING THE EXHAUST GAS RETURN RATE BY MEANS OF VIRTUAL NOX SENSORS WITH ADAPTATION VIA A NOX SENSOR

(75) Inventor: Olaf Erik Herrmann, Wassenberg (DE)

(73) Assignee: Fev Motorentechink GmbH, Aachen (DE)

( * ) Notice: Subject to any disclaimer, the term of this patent is extended or adjusted under 35 U.S.C. 154(b) by 1114 days.

(21) Appl. No.: 12/597,556

(22) PCT Filed: Apr. 26, 2007

(86) PCT No.: PCT/EP2007/003686
§ 371 (c)(1),
(2), (4) Date: Oct. 26, 2009

(87) PCT Pub. No.: WO2008/131789
PCT Pub. Date: Nov. 6, 2008

(65) Prior Publication Data
US 2010/0131181 A1 May 27, 2010

(51) Int. Cl.
*B60T 7/12* (2006.01)
*G05D 1/00* (2006.01)
*G06F 7/00* (2006.01)
*G06F 17/00* (2006.01)
*F02B 47/08* (2006.01)
*F02M 25/07* (2006.01)

(52) U.S. Cl.
USPC ................... 701/108; 123/568.11

(58) Field of Classification Search
USPC .......... 60/276, 278, 285; 123/406.48, 568.11, 123/568.21, 698, 674; 701/101–105, 108, 701/114, 115; 73/114.74
See application file for complete search history.

(56) References Cited

U.S. PATENT DOCUMENTS

| 6,360,159 | B1 | 3/2002 | Miller et al. | |
| 6,882,929 | B2* | 4/2005 | Liang et al. | 701/115 |
| 7,281,368 | B2* | 10/2007 | Miyake et al. | 60/285 |
| 2003/0225503 | A1* | 12/2003 | Mazur | 701/108 |
| 2005/0022511 | A1* | 2/2005 | Miura | 60/285 |

FOREIGN PATENT DOCUMENTS

| EP | 1 041 262 A2 | 10/2000 |
| EP | 1 790 840 A1 | 5/2007 |
| WO | WO-2005/045219 A1 | 5/2005 |

* cited by examiner

*Primary Examiner* — Stephen K Cronin
*Assistant Examiner* — Sizo Vilakazi
(74) *Attorney, Agent, or Firm* — Gifford, Krass, Sprinkle, Anderson & Citkowski, P.C.

(57) ABSTRACT

The present invention relates to a method for adjusting a mass flow of an exhaust gas return of an internal combustion engine, taking into consideration a NOx behavior, wherein a controlling system provides a coupling of a virtual NOx determination with a real NOx control. Furthermore, an internal combustion engine with appropriate controlling means is proposed.

16 Claims, 4 Drawing Sheets

SYSTEM FOR CONTROLLING THE EXHAUST GAS RETURN RATE BY MEANS OF VIRTUAL NOX SENSORS WITH ADAPTATION VIA A NOX SENSOR

CROSS-REFERENCE TO RELATED APPLICATIONS

This application is the U.S. national phase of international patent application PCT/EP2007/003686 filed Apr. 26, 2007.

FIELD OF THE INVENTION

The present invention relates to a method for adjusting an exhaust-gas recirculation system of an internal combustion engine under consideration of NOx behavior, as well as a diesel utility vehicle internal combustion engine with at least one exhaust-gas recirculation system.

BACKGROUND OF THE INVENTION

It is known that for a reduction of nitrogen oxide emissions for diesel motors, a portion of the exhaust gas is recirculated. This should allow a reduction of the oxygen concentration at the motor inlet. Through the magnitude of the exhaust gas recirculation rate, this exhaust gas recirculation system influences, among other things, a charge air temperature and also a charge pressure that is generated through turbocharging, in particular, in large utility vehicles. Especially for large utility vehicles, there is the desire to be able to directly measure and regulate nitrogen oxide emissions and also particulate emissions. However, while NOx sensors are already present in series production vehicles for this purpose, particulate sensors are to be found in the development stage. Control based on a signal from a NOx sensor is indeed possible; here, however, it can be problematic that, under dynamic operating conditions, the sensor signal generated in this way cannot indicate the current nitrogen oxide value, but instead only a time-delayed nitrogen oxide value.

SUMMARY OF THE INVENTION

The object of the present invention is to make possible a control that takes into account a time delay by a NOx sensor.

This objective is achieved with a method and with a diesel utility vehicle internal combustion engine as disclosed herein. Additional advantageous configurations and improvements are specified in the claims.

It is disclosed that a method for adjusting an exhaust-gas recirculation system of an internal combustion engine is performed under consideration of NOx behavior, wherein a controlling system provides a coupling of a virtual NOx determination with a real NOx control. This method can be executed in an especially advantageous way in a special diesel utility vehicle internal combustion engine that is also disclosed. This engine has at least one exhaust-gas recirculation system, one charge pressure turbocharging system, one diesel particulate filter, one catalytic converter, one NOx sensor, and one first control with respect to a recirculation rate of an exhaust-gas flow for adjusting a NOx value. A first controlling system has first control means that simulate a virtual NOx sensor, second control means that execute adaptive control of the virtual NOx sensor, and third control means that implement NOx control, wherein the first control is constructed so that the virtual NOx sensor specifies an initial setting for the first control.

The disclosed method is intended to enable the control of an exhaust gas recirculation mass flow. Preferably an exhaust gas recirculation mass flow is used as a control parameter. The control of the exhaust-gas recirculation flow has the advantage of faster control compared with an adjustment of a supercharging pressure. A setting of the supercharging pressure can be integrated into the framework of an overall control. By means of the setting of the exhaust gas recirculation mass flow, for example, an oxygen content in the intake pipe of the internal combustion engine is determined, advantageously measured at an inlet region into the internal combustion engine. A virtual sensor, advantageously a corresponding NOx model, advantageously analyzes a virtual oxygen content that would be corrected, for example, by an adaptive value, by means of which a virtual NOx value in the exhaust gas can be inferred.

Adaptation is performed, for example, with respect to the NOx model that is used. This advantageously has adaptive portions. Further adaptation can be performed, for example, in the field of determining a mass flow. Thus, for example, a mass charging model can be adapted. Advantageously, the mass charging model applies to a cylinder mass. Through its adaptation, a more precise determination of the needed values is produced, especially compared with an individual cylinder filling derived from all of the measurements. For example, if an exhaust-gas recirculation model is used, then this can also feature adaptation according to one configuration. Furthermore, there is the possibility to also integrate a particulate model, for example, a particulate filter model. Thus there is the possibility to adjust, for example, a particulate concentration in the exhaust gas. Advantageously, a particulate concentration in the exhaust gas is taken into account in the framework of the control and thus can lead to an adaptation of a NOx value to be adjusted. According to one embodiment, the disclosed particulate model can also take into account a particulate filter load. From this, a strategy for regenerating a particulate filter can be obtained. For example, by means of the model, it can be calculated when regeneration should be performed under NOx considerations. There is also the possibility of being able to stop the development of smoke due to particulate matter during operation. The model or the control can have predetermined limiting values that are taken into account for a smoke value, a particulate load of a particulate filter, and also a particulate concentration in the exhaust gas.

It is advantageous that transient advantages of a virtual NOx control are possible with an advantage of an increase in the accuracy of a direct control on the NOx signal of a NOx sensor through the proposed combination of a nitrogen oxide control on a fast NOx signal that is calculated virtually and an adaptation of a virtual nitrogen oxide signal by means of a NOx sensor. For this purpose, it is further disclosed that a control parameter of the NOx control is determined by means of a virtual NOx sensor. Furthermore, it is advantageous when a virtual NOx-dependent control parameter is compared with a NOx desired value determined from an engine characteristic map. As a control parameter for a virtually determined NOx control parameter, for example, an exhaust-gas recirculation mass flow is used, also called AGR mass flow below. Further acceleration of the control behavior is therefore possible in that the control reverts back to an exhaust-gas recirculation model. Here, the exhaust-gas recirculation model can have one or more forms, especially depending on whether there is a low-pressure and also a high-pressure exhaust-gas recirculation system in the internal combustion engine. Advantageously, each exhaust-gas recirculation model of the control in a quasi-stationary operating state of the internal combustion engine is calibrated by means of a signal of the NOx sensor. This has the advantage that the exhaust-gas recirculation model thus can also have a self-learning construction. On one hand, necessary corrections are performed for the calibration and, on the other hand, a basis of learning values advantageously increases. Based on these learning values, the exhaust-gas recirculation model can be interpolated and also extrapolated. The exhaust gas recirculation model can here be applied, for example, to simulation techniques of neural network technology, to fuzzy models, and also especially to systems of equations generated on the basis of the internal combustion engine, the components in or connected to the engine, and parameters determined by means of balancing limits.

The control also provides that a PID regulator is used for regulating a virtually determined NOx value. First, this allows that previously existing controlling systems that have a PID regulator can be expanded through the integration of the virtual NOx sensor. Second, the use of the PID regulator allows fast reactions, especially in transient ranges.

It has proven advantageous if a virtually determined NOx control parameter is adapted in the scope of an adaptive controlling system. For this purpose, it is advantageously provided that the adaptive controlling system uses a real NOx sensor. However, the adaptation is discontinued, for example, for fast load changes. Here it has been shown that often the dynamic response is too high and the adaptive controlling system would not be able to allow a careful adaptation of the virtually determined NOx control parameter. According to one embodiment, however, it is provided that an adaptation is performed even for fast load-change reactions. This can be performed, for example, in a mirrored system and can be checked for usability of the adaptation in connection with the load change or changes. Thus, for example, adaptation for transients can indeed be discontinued for the actual controlling system. Through a comparison of the values determined without adaptation and the virtual values obtained in the mirrored system with adaptation, however, through corresponding learning algorithms it can be provided that a quality of the mirrored system is created, so that for a minimum quality, even for fast load changes, the controlling system uses the adaptation through application of the adapted model determined in the mirrored system. The adaptation as a learning function advantageously uses a real NOx sensor, but can also revert back to other sensors or data.

For the controlling system, the method is accelerated if the controlling system operates an inner and outer cascade. The inner cascade here advantageously reverts back to a lambda probe, while the outer cascade advantageously reverts back to a real NOx sensor. Through the use of the lambda probe in the inner cascade, a faster signal flow is allowed. The lambda probe is not as slow as the real NOx sensors currently on the market. The lambda probe is used especially to perform a calibration of an air determination. Thus, for example, the exhaust gas recirculation model can provide an air flow to different locations. The lambda probe can be used for a calibration of these virtually determined values. The outer cascade is used especially for a calibration of a NOx determination. For this purpose, the values determined by the real NOx sensor can be compared with those used or determined in the exhaust gas recirculation model or by the virtual NOx sensor. In particular, with the outer cascade it can be guaranteed that the values determined using a model can still be tested.

In addition, a cascade controlling system in which the outer cascade reacts more quickly than the inner cascade has also proven effective. Here, for example, a real NOx sensor can be included in the inner cascade, while virtually determined values, advantageously oxygen values, are included in the outer cascade.

In addition to cascade control, there is also the possibility of providing map-based pilot control in addition to or instead of the cascade control. Here, for example, the virtual signal obtained using a model could specify a first adaptation of the NOx value that is then further processed by means of the corresponding control with reference to the values of the real NOx sensor. In addition, a control parameter circuit, for example, an auxiliary control parameter, can also be activated, and an auxiliary regulation parameter could also be activated. There is also the possibility of providing sequential control with map-based pilot control, especially with activation of the derivation of the relevant guide parameters.

Another embodiment provides that a lambda probe be arranged in the air path, for example, in the intake pipe. Thus, the oxygen content produced before the internal combustion engine can be determined using measurements. This can, indeed, also be calculated by means of a model, but this is not absolutely necessary. If a model is used for oxygen determination, for example, as a virtual oxygen sensor, this can also be adapted with the values of the lambda probe. In addition, a special lambda probe can also be used in the air path or in the exhaust-gas train. This probe is especially suitable for use during a cold start. These can be, advantageously, broadband lambda probes, and in particular, improved broadband lambda probes like those currently in development. The lambda probe can have, for example, a heating element. It can be, for example, constructed and/or operated as follows from DE 10 2004 057929 A1 which is incorporated herein by reference.

For a preferred use of the method, especially in a diesel utility vehicle engine, the first controlling system is built, for example, as a higher-order outer control cascade that has a second, inner control cascade with a quicker control time than that of the outer control cascade. With reference to this utility vehicle internal combustion engine, determination means are also advantageously provided for determining an oxygen concentration at an engine inlet of the diesel internal combustion engine and for determining an oxygen content of a recirculated exhaust gas. In this way, there is the possibility that the model can be calibrated or a correlation of a nitrogen oxide concentration in the exhaust gas can be calculated through direct determination from correlations. Such a correlation follows, for example, from the dissertation of O. E. Hermann at RWTH, Aachen titled "Emission control in utility vehicle engines across the air and exhaust-gas path." This dissertation is incorporated by reference in its entirety including the correlation, the basic construction of a regulation system with respect to a signal of a real NOx sensor, and an AGR regulator.

Advantageously it is provided that the adaptation is provided for adapting one or more models of the controlling system for calibrating virtually determined values of the models in the controlling system of the diesel utility vehicle internal combustion engine, wherein these models are connected for this purpose to a signal flow from the lambda probe and also from a NOx probe. This allows, in particular, a continuous calibration and, through the use of the learning function, an improved behavior of the diesel utility vehicle internal combustion engine. An improvement provides that the data determined especially by the model and the learning function can also be read out. If this is constructed for a plurality of identical diesel utility vehicle internal combustion engines, this data can also be combined and assembled into a single data set through corresponding preparation, especially weights with values relative to each other. This data set can then be stored as an initial setting in new diesel utility vehicle internal combustion engines.

BRIEF DESCRIPTION OF THE DRAWINGS

Advantages and additional features of the invention will be explained in greater detail below with reference to the drawings. Features described there, however, are not limited to the illustrated construction. The figures are also not to be interpreted as limiting. Instead, the features described there can be linked with other features in other constructions and also with those of the features described above to form improvements not listed in greater detail. Shown are.

DETAILED DESCRIPTION OF THE INVENTION

Figure 1:
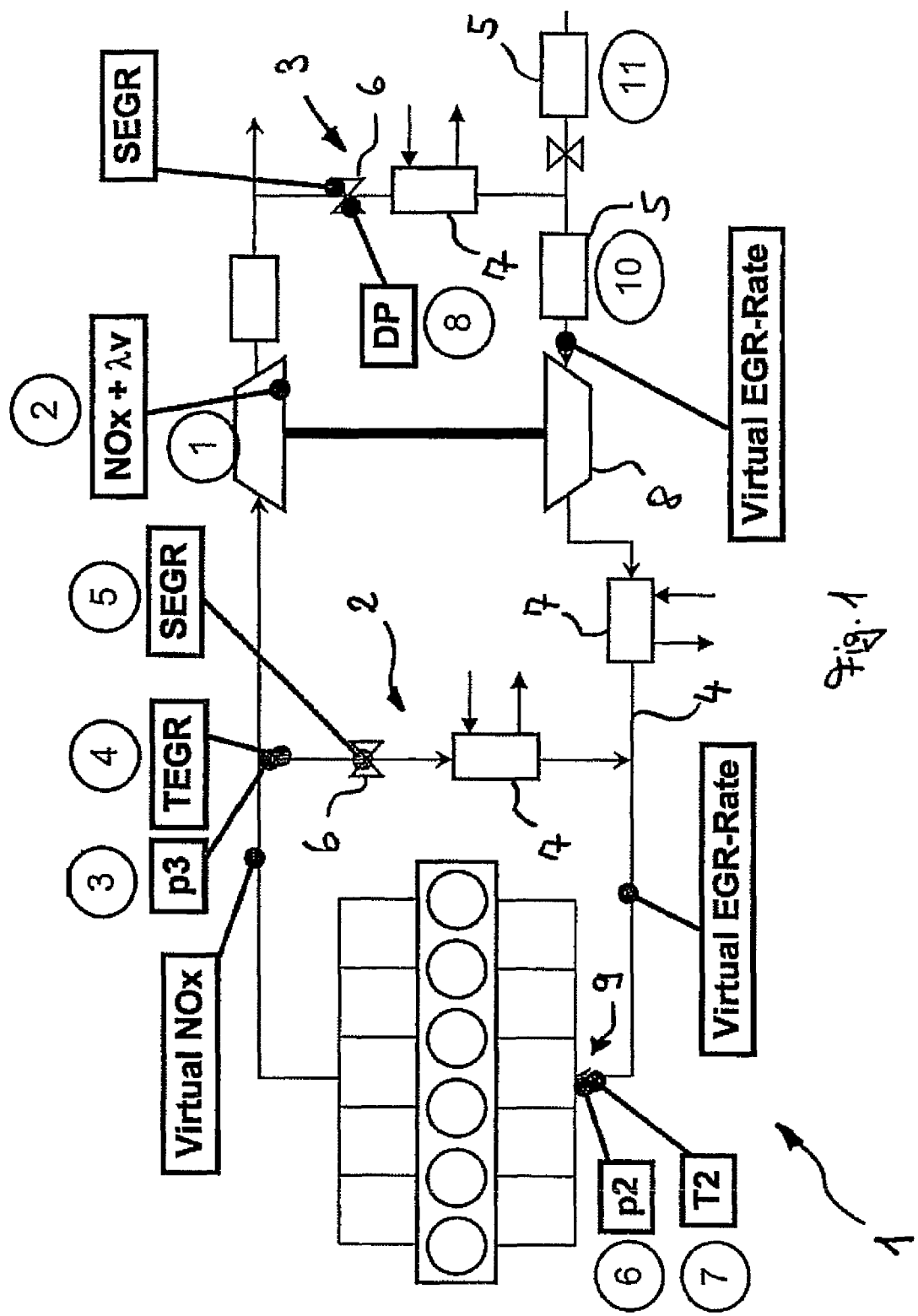
FIG. 1, a schematic view of a diesel utility vehicle internal combustion engine with actuators and sensors, FIG. 2, a schematic overview of an adaptation of an AGR mass flow by means of a lambda probe, FIG. 3, a schematic view of an adaptation of a NOx model by means of a NOx sensor, and FIG. 4, a schematic view of a mass flow determination by means of a mass charging model.

In a schematic illustration, FIG. 1 shows an internal combustion engine, especially a diesel utility vehicle internal combustion engine 1 with in each case associated connected assemblies, sensors, and actuators. The diesel utility vehicle internal combustion engine has a high-pressure exhaust gas recirculation system 2 and a low-pressure exhaust gas recirculation system 3. In an air feed 4 to the diesel utility vehicle internal combustion engine 1, various sensors or devices are used. Sensor positions or sensors are illustrated in FIG. 1 with circled numbers. When air is taken in by the diesel utility vehicle internal combustion engine 1, this can be measured directly at the inlet by an air mass sensor 5, especially a hot film air mass sensor. If, as shown, the low-pressure exhaust gas recirculation system 3 is present, exhaust gas is also fed from there. This can make it necessary for another air mass sensor 5 to be provided. In the low-pressure exhaust gas recirculation system 3, advantageously there is also a cooler 7 in addition to a control valve 6. Therefore, the recirculated exhaust gas is cooled to such a temperature that a compressor 8 of an exhaust gas turbocharger is in the position to make available a sufficient compressed air mass flow to the internal combustion engine. Arranged after the compressor 8, there is, advantageously, in turn, a cooler 7, in order to be able to dissipate the temperature in the gas resulting during the compression. Additional exhaust gas that was cooled by means of a corresponding cooler can then be added through another control valve 6 to the gas flow cooled in this way via the high-pressure exhaust gas recirculation system 2. Additional sensors that record parameters for the control are advantageously arranged at a motor inlet 9. Exhaust gas can then be discharged from the diesel utility vehicle internal combustion engine 1, wherein a partial mass flow is fed to the high-pressure exhaust gas recirculation system 2 or to the low-pressure exhaust gas recirculation system 3. In addition, a main flow of the exhaust gas is used by means of a turbine 10 of the exhaust gas turbocharger in order to drive the compressor 8. Instead of an exhaust gas turbocharger, another charge pressure loading can also be constructed. For this purpose, for example, a mechanical charger or other means can be used. After the turbine 10, there is a diesel particulate filter 11 and also a catalytic converter 12. For the sake of simplicity, only the diesel particulate filter 11 is shown. In addition, in the exhaust gas train, there is also a NOx sensor as well as a lambda probe.

The diesel utility vehicle internal combustion engine 1 that follows from FIG. 1 is used in the scope of the disclosed method as follows: the AGR control concept advantageously provides the shown combination of high-pressure AGR and low-pressure AGR, but can alternatively also be constructed with a separate high-pressure AGR or low-pressure AGR. In the exhaust gas, an exhaust gas concentration is measured after the turbine 10 with a NOx sensor at position 2 in the circuit. By means of an exhaust gas pressure sensor, position 3 in the circuit, and an exhaust gas temperature sensor, position 4 in the circuit, a state of the exhaust gas, especially a density, before the control valve 6, the high-pressure AGR valve, is measured. A charge pressure P2 is measured with a charge pressure sensor at position 6 in the circuit. In the control valve 6 of the high-pressure exhaust gas recirculation system 2, a position SEGR of the valve is determined. By means of the density of the exhaust gas before the valve and using the differential pressure from P3 and P2 across the valve, an AGR mass flow can then be calculated. In addition, an air efficiency model not described in greater detail here is then present. To this is fed the charge pressure P2 and an intake pipe temperature T2, positions 6 and 7 in the circuit. From this, the air efficiency model can calculate an engine mass flow. In the case of the presence of low-pressure AGR and high-pressure AGR as shown, it is necessary for this case that the low-pressure AGR mass flow be also calculated or measured. In contrast, if there is no low-pressure AGR, then the AGR rate and the fresh air mass flow can also be calculated by means of the air efficiency model. A low-pressure AGR mass flow is determined by a differential pressure measurement DP at position 8 in the circuit. For this purpose, advantageously, a pressure drop across a diaphragm in the exhaust gas train of the low-pressure AGR path is determined. Alternatively, an air mass sensor before the low-pressure AGR feed, position 10 in the circuit, and an air mass sensor after the low-pressure AGR feed, position 11 in the circuit, can be used. From this, the low-pressure AGR rate can be calculated. If an air mass sensor is present, then the model of a high-pressure exhaust gas recirculation system can also be eliminated, and a high-pressure exhaust gas recirculation rate can be calculated from a fresh air mass flow measured at position 11 in the circuit and an engine mass flow of an air efficiency model. For example, an exhaust gas recirculation rate can also be determined by means of a model as follows, for example, from DE 102 42 234, which is herein incorporated by reference.

The sensors and models described above allow the calculation of the exhaust gas recirculation rate, and the use of an oxygen content of the corresponding recirculated exhaust gas allows a calculation of an oxygen concentration of the gas fed to the internal combustion engine as a target. Here, an oxygen content of the recirculated exhaust gas can be determined with reference to a lambda signal of the NOx sensor, for example, at position 2 in the circuit. By means of an oxygen concentration at the engine inlet 9, a nitrogen oxide concentration in the exhaust gas can be calculated by means of correlations that are described in the dissertation specified above and incorporated by reference. With respect to this correlation, refer to the dissertation in the scope of this application. With the provided construction, it is thus possible to be able to operate an adaptive NOx regulator with a high-pressure and a low-pressure exhaust gas recirculation system. For this purpose, by means of a model, a virtual NOx signal is determined. This is used as a control parameter and compared with a NOx desired value. This desired value is advantageously obtained from an engine characteristic map and indeed in dependence on an engine speed and engine load. A conventional PID regulator is then used in order to regulate a deviation of the virtual NOx signal from the desired value. A control parameter of the PID regulator for this purpose is a desired AGR mass flow. This can be transformed with the AGR model into a corresponding desired AGR valve position. The AGR model here takes into account, among other things, the state of the corresponding AGR valve and therefore can provide compensation, for example, of a changing pressure in front of the turbine. Internal position regulation of the AGR valve regulates a position of the valve and reports the actual position back to the AGR model that calculates, in turn, the actual AGR mass flow. An AGR regulator structure thus can provide an AGR model, a NOx model and, also connected to this, the internal combustion engine and corresponding data streams between these components. Thus, the pressures P2, P3, and also the temperature TEGR and the position value SEGR are included in the AGR model. Included in an air efficiency model are, in turn, the temperature T2, a value of the lambda sensor, and also the pressure P2. The AGR mass flow determined by the model is made available by the AGR model. From this, the air efficiency model calculates additional values, in particular, a mass flow that is fed to the internal combustion engine, an exhaust gas/air ratio, and also values of the NOx sensor. From this, the NOx model determines a virtual NOx signal. This is made available to the PID regulator, wherein the PID regulator receives the virtual NOx signal linked with a desired NOx value. The NOx value desired as an input signal is given from an engine characteristic map. For this, the PID regulator determines a mass flow of the exhaust gas recirculation system from which, by means of the AGR model, the control path of the corresponding exhaust gas recirculation valve is produced.

The virtual AGR rate that follows from FIG. 1, designated there as "virtual EGR rate," thus can be calculated by means of a mass flow balance. The virtual AGR rate on the high-pressure side is calculated from a model. Such an approach also allows, in particular, an elimination of an air mass sensor.

One possible AGR regulator structure and also a respective adaptation in the scope of the AGR or NOx model is explained in greater detail below. However, this is only one of various possibilities for how a controlling system can be implemented.

Figure 2:
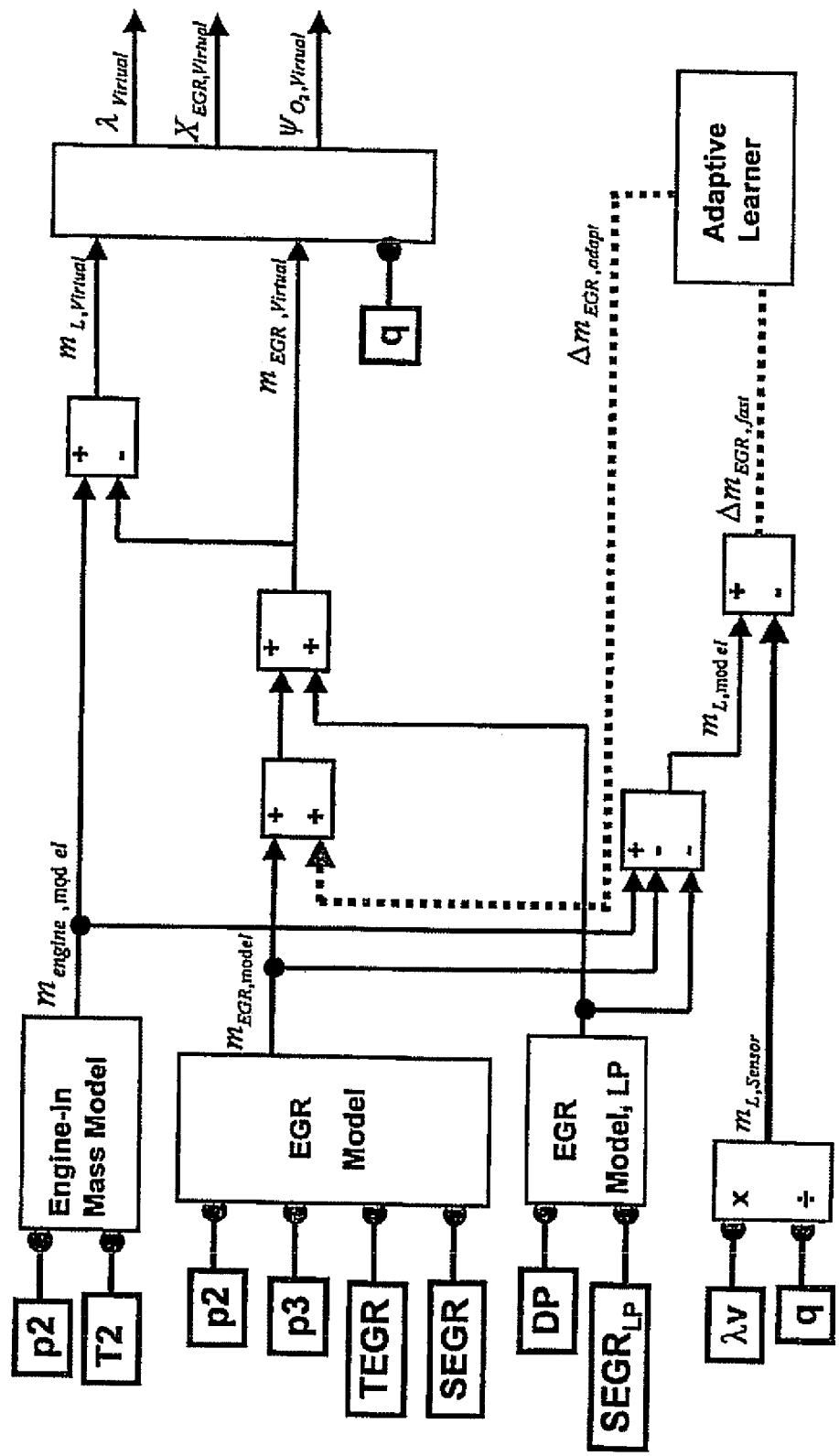

FIG. 2 shows, in schematic view, an adaptation of an AGR mass flow by means of a lambda probe. This adaptation occurs as follows: in an air efficiency model, here designated with "engine-in-mass model," the pressures and temperatures P2, T2 known from FIG. 1 are included. In the AGR model, here designated "EGR model," the values P2, P3, TEGR, and SEGR are included. In the AGR model for the low-pressure exhaust gas recirculation system, the pressure difference DP and also the position $SEGR_{LP}$ are included. Here, LP stands for "low pressure." Under the AGR model, for the low-pressure exhaust gas recirculation system, a lambda probe or the values determined by means of the sensors provided there are specified. The structure of the controlling system provides that the mass flows determined from the respective models be each linked with each other and relayed. In order to be able to detect, in particular, also the transient range in the scope of the regulation, a learning function is integrated, here designated as "adaptive learner." By means of the learning function stored there, an adaptation of the virtually determined mass flows can take place. Here, as already stated above with reference to FIG. 1, an AGR mass flow recirculated in the low-pressure exhaust gas recirculation system is determined virtually and by means of this, the learning function is adapted. This value is included in the model of the high-pressure exhaust gas recirculation system by means of which, in turn, under linking with the air efficiency model, the virtually determined mass flows for the air and the exhaust gas recirculation rate are produced, so that, in addition to a virtual lambda, a virtual oxygen content and also an exhaust gas recirculation rate are produced. To this, the results are fed that can now be transferred from the virtual exhaust gas recirculation models and from the air mass sensors into the NOx model.

Figure 3:
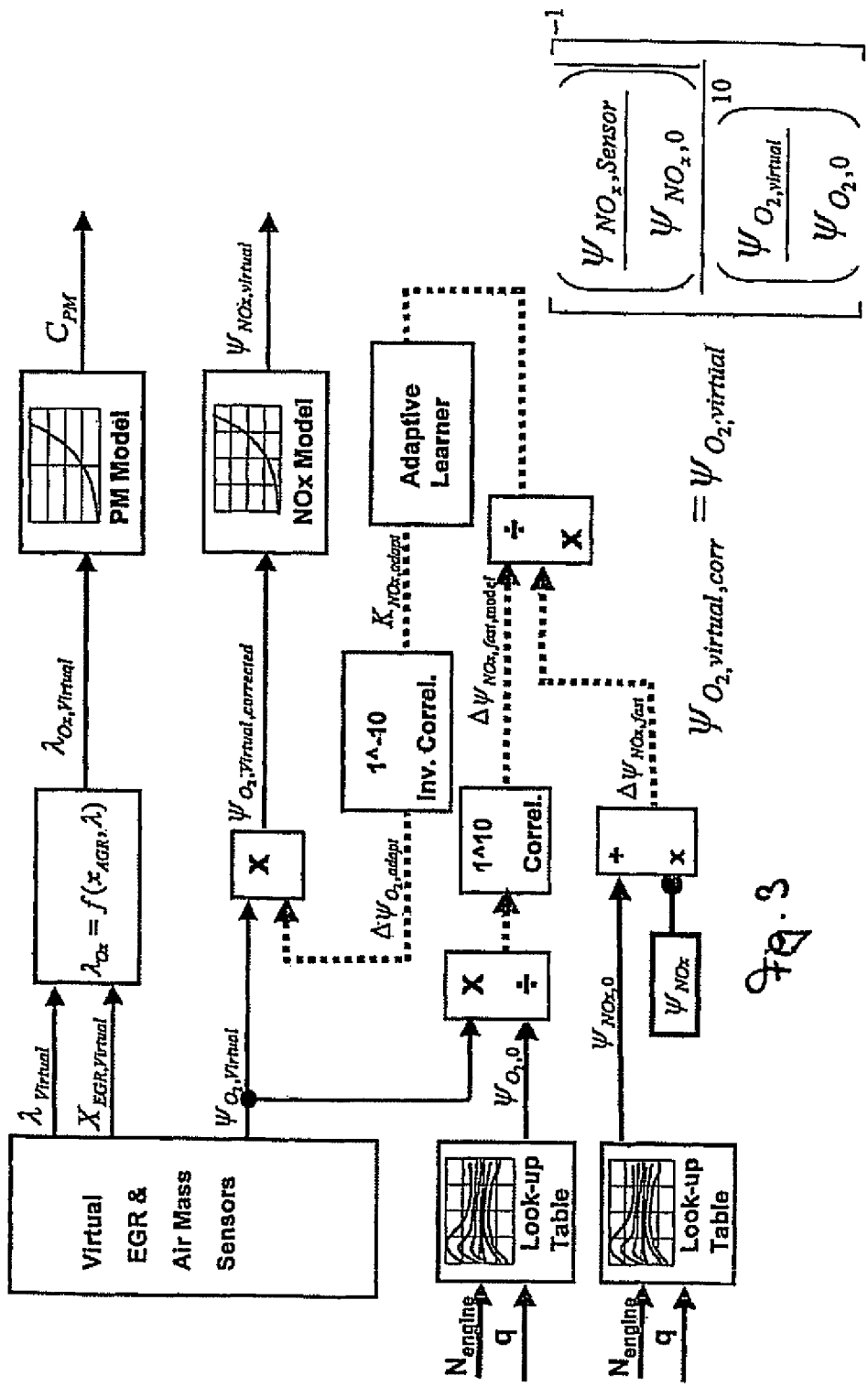

FIG. 3 shows an adaptation of the NOx model by means of the values determined by means of the NOx sensor. The virtual values air efficiency $\lambda_{virtual}$, virtual AGR rate $X_{EGRvirtual}$, and the virtual oxygen quantity $\Psi_{O2virtual}$ determined from FIG. 2 are used, for example, to determine a virtual oxidation air ratio $\lambda_{Ox,virtual}$. This is included in a particulate model. From this, a particulate concentration $C_{PM}$ in the exhaust gas can be determined. From the quantity $\Psi_{O2virtual}$ of the oxygen, under consideration of an oxygen quantity difference that was adapted, a corrected quantity of oxygen $\Psi_{O2virtual,corrected}$ is fed to a NOx model. From this, a virtual quantity of NOx can then be determined. The formula for the determination of the oxygen quantity that is corrected virtually is given here from the relationship that follows from FIG. 3. From the virtual oxygen quantity and the engine characteristic map determined by means of a rotational speed $N_{engine}$ and a load q, a desired value of an oxygen quantity is supplied. The same is performed for a quantity of NOx as a desired value from an engine characteristic map, wherein this value is also compared with the quantity NOx determined by the NOx sensor. While a difference of the NOx quantity as a model-based, quickly determined value is realized by means of a correlation from the comparison of the oxygen quantity, the comparison of the NOx quantity from the engine characteristic map or from the NOx sensor produces a second difference value. These two values are compared with each other and then provided to a learning function. From this, an adapted NOx value is now provided to an inverse correlation from which a difference value is then produced for the oxygen quantity in the form of $\Delta\Psi_{O2,adapt}$. The correlation that is advantageously used here is produced from the dissertation named above, especially from the Equation 2-3 specified on Page 7. The determined difference value is then included in the comparison with the virtually determined oxygen quantity and corrects this quantity. This corrected value is included in the NOx model, wherein from this NOx model, now the virtual NOx quantity $\Psi_{NOx,virtual}$ can be determined. The target here is for the NOx value that is determined by the NOx sensor to specify an actual state description and agree as much as possible with the value that could be finally determined in this way by the NOx model as the NOx quantity $\Psi_{NOx,virtual}$. Due to the virtual values that are available more quickly and also the use of the learning function and thus the adaptation, a quicker and especially also more precise setting of a mass flow in the exhaust-gas recirculation system can be performed, in order to be able to maintain the desired nitrogen values or particulate values.

Figure 4:
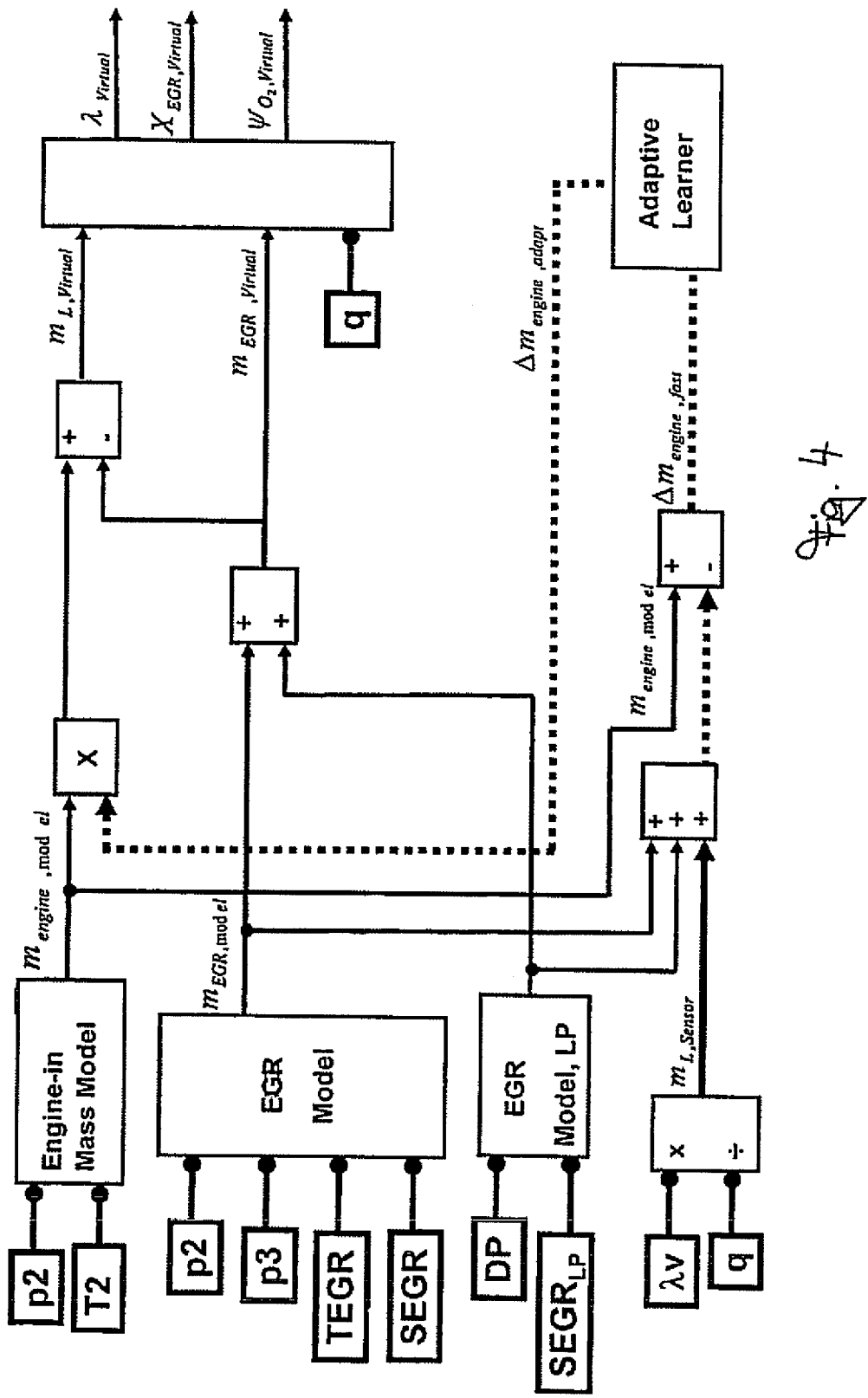

FIG. 4 shows another example, especially in connection with the system that follows from FIG. 2, for determining mass flows under the use of a mass charging model of a cylinder. In addition to the use of the individual models, in the realization that follows from FIG. 4, an adaptation of the mass charge from the "engine-in mass model" by means of a shown adaptation is performed. The value determined in this way is finally used to obtain a virtual air value. Simultaneously, this is linked with a virtual AGR mass flow and a load, so that the connected module can determine the virtual values of air efficiency $\lambda_{virtual}$, the virtual AGR rate $X_{EGRvirtual}$, and the virtual oxygen quantity $\Psi_{O2virtual}$.

From the individual figures, different parameters, inputs, and also outputs and connections can be inferred. These are not described in detail in words, but are to be inferred as shown from the figures. The figures and their contents, however, are not limiting but are to be interpreted, instead, as examples. Therefore, parts of the connections, parameters, inputs, and outputs can also be modified, left out, or supplemented by other parts. Also, individual parts or sections and also parameters, connections, inputs, and outputs can be used to assemble new schematics with which the method can be performed and the control can be added.

It is claimed:

1. A method for adjusting a mass flow of an exhaust gas recirculation system of an internal combustion engine under consideration of a NOx behavior, said method comprising:
    providing a controlling system which provides a coupling of a virtual NOx determination with a real NOx control by:
        providing a virtual oxygen quantity ($\Psi_{O2,\ Virtual}$) from virtual EGR and air mass sensors;
        providing a desired value of an oxygen quantity ($\Psi_{O2,0}$) and a desired value of a NOx quantity ($\Psi_{NOx,0}$) from an engine characteristic map and as a function of engine rotational speed ($N_{engine}$) and load (q);
        determining a first model-based NOx quantity difference ($\Delta\Psi_{NOx,fast,model}$) from the virtual oxygen quantity ($\Psi_{O2,\ Virtual}$) and the desired value of an oxygen quantity ($\Psi_{O2,0}$);
        determining a second NOx quantity difference ($\Delta\Psi_{NOx,fast}$) from the desired value of a NOx quantity ($\Psi_{NOx,0}$) and a NOx sensor value ($\Psi_{NOx}$);
        comparing the first model-based NOx quantity difference ($\Delta\Psi_{NOx,fast,model}$) to the second NOx quantity difference ($\Delta\Psi_{NOx,fast}$) and providing the comparison to a learning function, the learning function providing an adapted NOx value ($\Psi_{NOx,\ adapt}$);
        providing the adapted NOx value ($\Psi_{NOx,\ adapt}$) to an inverse correlation that provides an oxygen difference quantity ($\Delta\Psi_{O2,adapt}$);
        comparing the virtual oxygen quantity ($\Psi_{O2,\ Virtual}$) with the oxygen difference quantity ($\Delta\Psi_{O2,adapt}$) and providing a corrected virtual oxygen quantity ($\Psi_{O2,\ Virtual,corrected}$); and
        providing the corrected virtual oxygen quantity ($\Psi_{O2,\ Virtual,corrected}$) to a NOx model that produces a virtual NOx quantity ($\Psi_{NOx,virtual}$),
    for the purpose of coupling a virtual NOx determination with a real NOx control in order to allow a quick and precise setting of the mass flow in the exhaust-gas recirculation system to be performed.

2. The method according to claim 1, wherein a control parameter of the NOx control is determined by means of a virtual NOx sensor.

3. The method according to claim 1, wherein a virtual NOx-dependent control parameter is compared with a NOx desired value determined from an engine characteristic map.

4. The method according to claim 1, wherein an AGR mass flow is used as a control parameter for a virtually determined NOx control parameter.

5. The method according to claim 1, wherein the NOx control reverts back to an exhaust gas recirculation model.

6. The method according to claim 1, wherein an exhaust gas recirculation model of the controlling system in a quasi-stationary operating state of the internal combustion engine is calibrated by means of a signal of a real NOx sensor.

7. The method according to claim 1, wherein the controlling system uses a PID regulator for regulating a virtually determined NOx value.

8. The method according to claim 1, wherein a virtually determined NOx control parameter is adapted in the scope of an adaptive control.

9. The method according to claim 8, wherein the adaptive control uses a real NOx sensor.

10. The method according to claim 1, wherein the controlling system operates an inner and an outer cascade, wherein the inner cascade reverts back to a lambda probe, while the outer cascade reverts back to a real NOx sensor.

11. The method according to claim 10, wherein the inner cascade performs a calibration of an air determination.

12. The method according to claim 10, wherein the outer cascade performs a calibration of a NOx determination.

13. The method according to claim 8 further including the step of testing whether a prerequisite for an application of an adaptation of the controlling system is still present and if it is determined that the prerequisite has been eliminated, the adaptation of the controlling system is discontinued.

14. The method according to claim 1, wherein the virtual NOx determination is performed more quickly than the determination of a NOx value by means of a real NOx sensor.

15. The method according claim 1, wherein a parameter characterizing a particulate stream is determined under the use of a virtually determined oxygen content.

16. The method according to claim 1, further including determining a virtual oxidation air ratio ($\lambda_{Ox,virtual}$), supplying the virtual oxidation air ratio ($\lambda_{Ox,virtual}$) to a particulate model that determines a particulate concentration ($C_{PM}$) in an exhaust gas passing through the exhaust gas recirculation system.

* * * * *